United States Patent Office 3,122,526
Patented Feb. 25, 1964

3,122,526
COMPOSITIONS CONTAINING A PLURALITY OF AMINE GROUPS
Walter H. Schuller, Lake City, Fla., and Lindley C. Beegle, Darien, Conn., assignors to American Cyanamid Company, New York, N.Y., a corporation of Maine
No Drawing. Continuation of application Ser. No. 618,444, Oct. 26, 1956. This application Apr. 29, 1960, Ser. No. 25,536
6 Claims. (Cl. 260—88.7)

This invention relates broadly to compositions containing a plurality of amine (amino) groups and to a method of preparing the same. More particularly, it is concerned with compositions comprising the product of hydrogenation of an alpha-carbon cyanoethylated polymer of acrylonitrile, e.g., an alpha-carbon cyanoethylated homopolymer of acrylonitrile.

It was known prior to our invention that acrylonitrile could be added, with the aid of alkaline catalysts, to compounds containing one or more atoms of active hydrogen thereby to form cyanoethylated products (see, for example, Compt. rend., 27th Cong. intern. chim. ed. Brussels (1954), III, 363–6, and the bibliography therein; also U.S. Patents 2,608,554–5 to Bullitt, Jr., each dated August 26, 1952). Alpha-carbon cyanoethylated polyacrylonitriles (that is, a polymer of acrylonitrile wherein a cyanoethyl group is attached directly to the carbon atom in the 1- or alpha-position of the acrylonitrile unit in the polymer chain) can be prepared by the base-initiated polymerization of acrylonitrile alone or with an other monoethylenic monomer (see the aforementioned patents to Bullitt, Jr.); or they can be prepared by a base-initiated reaction between monomeric acrylonitrile and polyacrylonitrile, e.g., a "free radical"-initiated polymer of acrylonitrile, for instance as disclosed and claimed in the copending application of one of us (Walter H. Schuller), Serial No. 572,832, filed March 21, 1956, now United States Patent No. 2,977,337, issued March 28, 1961.

It is a primary object of the present invention to provide a new class of polymeric compositions, more particularly, modified polyacrylonitriles, for use in industry.

Another object of the invention is to provide new compositions containing a plurality of amino groups.

It is a further object of the invention to increase the field of utility of polymers of acrylonitrile by a treatment which alters their chemical constitution and their properties.

Another object of the invention is to provide a method of preparing the hydrogenated polyacrylonitrile compositions of this invention.

Still other objects of the invention will be apparent to those skilled in the art from the following more detailed description and the illustrative examples.

The foregoing objects are accomplished by hydrogenating an alpha-carbon cyanoethylated polymer of acrylonitrile. Hydrogenation of the said polymer can be continued until there is no further "take-up" of hydrogen; or any desired degree of partial hydrogenation of the aforesaid cyanoethylated polymer can be effected, thereby to obtain a hydrogenation product having the optimum constitution and combination of properties that will best adapt it for the particular service use. Thus, for some applications of the hydrogenation product (e.g., as a flocculating agent, a soil-conditioning and/or soil-stabilizing agent, or as an oil-well drilling-mud additive), it may be desirable that as little as, say, from 1% to 3% of the total number of nitrile groups initially present in the alpha-carbon cyanoethylated polymer be reduced; while in other applications (examples of which are given hereinafter) it may be desirable that hydrogenation be continued until there is no further take-up of hydrogen, that is, until there has taken place the maximum reduction of the nitrile groups, initially present in the starting polymeric reactant, that can be effected under the chosen conditions of hydrogenation.

Hydrogenation products having a combination of properties that are generally most suitable for the usual applications are those wherein an average of up to about 60% of the total number of nitrile groups initially present in the cyanoethylated polymeric starting reactant have been reduced, and more particularly those wherein an average of between about 5% and about 50% of the total number of the aforesaid nitrile groups have been reduced. A preferred sub-class of hydrogenation products embraced by this invention are products comprising a hydrogenated composition which is the product of hydrogenation of an alpha-carbon cyanoethylated polymer of acrylonitrile, and wherein an average of between about 10% and about 30% of the total number of nitrile groups initially present in the aforesaid cyanoethylated polymer have been converted to amino groups that are titratable with perchloric acid in glacial acetic acid.

Any suitable method of hydrogenating the alpha-carbon cyanoethylated polyacrylonitrile can be used. For instance, one can catalytically hydrogenate such a polymer, e.g., a dimethylformamide-soluble, alpha-carbon cyanoethylated polymer of acrylonitrile, under superatmospheric pressure and at a temperature of at least 100° C. but below the temperature of decomposition of the said cyanoethylated polymer and of the hydrogenation product thereof, after which the hydrogenation product is isolated from the reaction mass by any suitable means. Advantageously, the hydrogenation is effected under an initial hydrogen pressure of at least 500 p.s.i. (gauge pressure), usually at least 1000 p.s.i., for instance from about 1500 p.s.i. to about 10,000 p.s.i. or higher, as desired or as conditions may require. The temperature of the reaction mass during hydrogenation is generally within the range of from about 100° C. to about 190°–200° C., the upper limit having been broadly set forth hereinbefore. Good results are obtained when the reaction temperature is maintained within the range of from about 110° C. to about 180° C., more particularly at about 120° C.–150° C.

Any of the hydrogenation catalysts known to be effective in reducing a nitrile group with hydrogen can be employed. Among examples of such catalysts may be mentioned nickel and cobalt catalysts, for instance, skeletal (e.g., Raney) nickel and cobalt catalysts. Another suitable catalyst is palladium (5%) on finely divided carbon. A nickel catalyst, more particularly a Raney nickel catalyst, is preferred. The weight ratio of catalyst to cyanoethylated polyacrylonitrile can be, for instance, from 0.01:1 to 1:1, or higher than the latter ratio, if desired.

The hydrogenation of the alpha-carbon cyanoethylated polyacrylonitrile (polymer of acrylonitrile) is usually carried out while the said polyacrylonitrile is dissolved or dispersed in a medium which is liquid at the temperature and pressure of reaction (including normally liquid media), and advantageously one which is a solvent for the alpha-carbon cyanoethylated polymer of acrylonitrile, e.g., dimethylformamide. Preferably such a medium is one which is inert during the hydrogenation reaction, e.g., dimethylformamide, diethylformamide, N,N-dimethylacetamide, N,N-dimethylpropionamide, N,N-diethylacetamide and higher members of the homologous series. The use of a solvent or dispersion medium (e.g., acetone, acetonitrile, etc.) which is reactive (that is, will take up hydrogen) during the course of the reaction is not precluded, but is less desirable because of the added consumption of hydrogen that results from the use of such a medium and the greater difficulty in controlling the hydrogenation of the alpha-carbon cyanoethylated polyacrylonitrile so that it will proceed to the desired end-point. The concentration of the cyanoethylated polymer in the liquid medium may be varied as desired or as conditions may require; for example, the cyanoethylated polymer may constitute from about 1% to about 20% by weight of the total amount of said polymer and solvent or dispersion medium.

The hydrogenation is generally effected in a vessel provided with means for agitation of the contents and adapted to withstand the superatmospheric pressure employed, e.g., a rocking autoclave. The hydrogenation is ordinarily allowed to proceed to the point where there is no further absorption (take-up) of hydrogen, as evidenced by the fact that there is no further drop in pressure. The autoclave is then cooled, vented and the contents discharged. The hydrogenataion catalyst is separated, e.g., by centrifuging the reaction mass, after which the hydrogenated product is isolated from the liquid medium in which it is usually dissolved or dispersed prior to hydrogenation. In the case of a solvent such as dimethylformamide, this can be done quite readily by high-vacuum stripping off of the dimethylformamide at about 100° C., followed by a day or two in a vacuum desiccator over sulfuric acid at about 1 to 2 mm. mercury pressure.

The hydrogenated products are usually brownish-red, friable solids that exhibit some solubility in aqueous hydrochloric acid and are completely soluble in glacial acetic acid. The titratable amine, determined by titration with perchloric acid in glacial actic acid, is believed to be a secondary amine of an intromolecular, cyclic type, e.g.,

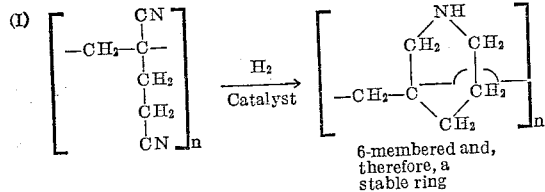

(I)

for the following reasons:

(1) A Van Slyke analysis for amino nitrogen is found to be essentially negative (no —NH₂ groups).

(2) The polymer is completely soluble in glacial acetic acid, indicating the absence of cross-linking in the polymer, during the reduction; hence the two nitrile groups involved must both be on the same molecule and not on two different molecules.

(3) The structure

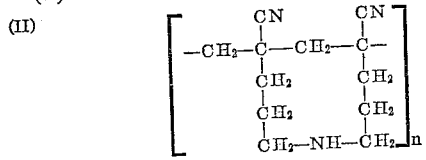

(II)

is eliminated on the basis of its ring size (10-membered). It is recognized that the structure

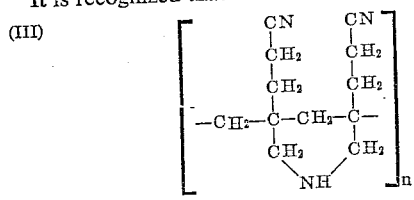

(III)

may be considered to be an alternate possibility.

The present invention provides a new class of compositions containing a plurality of amino groups for use in industry; and, also, provides a new use for alpha-carbon cyanoethylated polymers of acrylonitrile. High-molecular-weight (polymeric) amines are needed by industry for a wide variety of applications, e.g., in textile-finishing compositions; and the practicing of the present invention provides such amines. It is further pointed out that polymeric secondary amines are, to the best of our knowledge and belief, in almost unknown in industry at the present time; and that they are, at best, only laboratory "curiosities." Our invention, as indicated by the available analytical evidence, provides a new class of polymeric amino bodies or compositions that contain a plurality of secondary amino groups.

Additionally, it may be mentioned that a "free radical"-initiated polymer of acrylonitrile in which the nitrile group is secondary (2°), e.g., as in a polymeric acrylonitrile containing the recurring unit structure (IV) 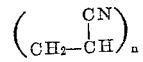

cannot be hydrogenated to a practicable extent by known methods. The alpha-carbon cyanoethylation of a free radical-initiated polymer of acrylonitrile converts the secondary nitrile groups that are present in such a polymer to tertiary (3°) nitrile groups; and, also, introduces primary (1°) nitrile groups into the polymer molecule. We have surprisingly found that both the primary and tertiary nitrile groups initially present in an alpha-carbon cyanoethylated polymer of acrylonitrile are more susceptible to hydrogenation, especially to form hydrogenation products of the kind hereinbefore described (i.e., polymeric compositions containing a plurality of amino groups and which, according to the available evidence, are secondary amino groups), than are the secondary nitrile groups that are present in a free radical-initiated polymer of acrylonitrile; primary, secondary and tertiary nitrile groups are designated as those attached to carbon atoms containing two, one and no hydrogen atoms respectively.

In addition to the uses hereinbefore mentioned, the hydrogenation products of our invention are useful as, for instance, adjuvants to peroxy catalysts in resin formulations; as catalysts for epoxy resins; in making acid-addition salts that are useful as antistatic agents; in coating aggregates prior to admixture with bituminous compositions; in cement mixtures; as thickening agents and as modifiers, more particularly as plasticizers, of high-molecular-weight synthetic resins; as a reactant with an aldehyde, e.g., formaldehyde, to make aldehyde-reaction products that are useful in such applications as have just been mentioned, such aldehyde-reaction products also being useful as components of textile-finishing compositions; and for many other purposes that will be apparent to those skilled in the art from the description of our invention, as herein given, and from the uses set forth above and hereinafter.

PREPARATION OF AN ALPHA-CARBON CYANO-ETHYLATED POLYMER OF ACRYLONITRILE

Two general methods of preparing the alpha-carbon cyanoethylated polymers of acrylonitrile that are hydrogenated in practicing the present invention have been given in the second paragraph of this specification.

In accordance with the second of the named methods (disclosed and claimed in the aforementioned Schuller copending application Serial No. 572,832 now United States Patent No. 2,977,337, issued March 28, 1961) reaction is effected between acrylonitrile and a polymer of acrylonitrile, while admixed with a strong base (e.g., an alkali-metal methoxide, ethoxide or tert.-butoxide) as a catalyst for the reaction and at a temperature of from about —75° C., to about +75° C., more particularly at from +10° C. to +50° C. The reaction is effected in a mutual solvent for the monomeric and polymeric acrylonitrile reactants which is inert during the reaction, e.g., dimethylformamide. The polyacrylonitrile reactant is one containing an average of at least 50% by weight of acrylonitrile combined in the polymer molecule; it contains in its molecular structure a multiplicity of units represented by the formula (V)  

where $n$ represents a number having an average value ranging between 8 and 60,000. At the end of the reaction period the cyanoethylated polyacrylonitrile is isolated from the reaction mass. Both acetone-soluble and acetone-insoluble cyanoethylated polyacrylonitrile can be recovered.

Suitable catalysts (that is, strong bases) for use in carrying out the reaction are given in, for instance, the aforementioned Bullitt, Jr., patents and include alkali-metal alkoxides, aryls and amides, e.g., sodium and potassium methoxides, ethoxides and tert.-butoxides, sodium and potassium amides, phenyllithium, indenyllithium, lithium ethylphenylamide, lithium diphenylamide; and the salts, with alkali-forming metals (group IA and IIA metals), of alkanes, aralkanes, nitriles, amines, etc., e.g., dianiline calcium, ethylsodium, etc. Such catalysts have been described as being salts, with an alkali-forming metal, of an acid having a pKa of from 15 to 75. Other suitable catalysts include the strongly basic quaternary ammonium hydroxides, e.g., tetramethyl ammonium hydroxide, tetraethanol ammonium hydroxide, benzyl trimethyl ammonium hydroxide, benzyl triethyl ammonium hydroxide, and others.

The base is employed only in catalytic amounts; that is to say, in amounts within the range of from about 0.01% to 5%, and preferably from 0.1% to 2%, by weight of the total weight of acrylonitrile and acrylonitrile polymer.

The polymeric acrylonitrile reactant can be either a homopolymer of acrylonitrile or a copolymer (including random, graft and block copolymers) of acrylonitrile containing an average of, for instance, at least 50%, e.g., from 55% to 99%, by weight of acrylontrile combined in the polymer molecule. Preferably, when producing the cyanoethylated polyacrylonitriles that are used in practicing the present invention, the polymeric acrylonitrile reactant is a polymer of acrylonitrile containing an average of at least about 90% of acrylonitrile combined in the polymer molecule; that is, either a homopolymer of acrylonitrile or a copolymer of acrylonitrile containing an average of from 90% up to (but less than) 100% (e.g., 99.9%) of acrylonitrile combined in the polymer molecule, the units and number thereof preferably being the same as stated above.

The polymers to which reference is made in the preceding paragraph are prepared by conventional methods, for example, by "free radical" initiation of polymerization of the monomer or mixture of monomers with peroxide catalysts, "redox" catalyst systems, etc. Further information on polymerization techniques that can be used in preparing the acrylonitrile polymer reactant will be found in Fikentscher et al. U.S. Patent No. 2,140,048, dated December 13, 1938; Bauer et al. U.S. Patent No. 2,160,054, dated May 30, 1939; Crawford et al. U.S. Patent No. 2,194,354, dated March 19, 1940; Britton et al. U.S. Patent No. 2,333,635, dated November 9, 1943; Jacobson U.S. Patent No. 2,436,926, dated March 2, 1948, and British Patent 586,881 with reference to the production of other polymerization products.

Illustrative examples of substances that can be copolymerized with acrylonitrile to form a copolymeric reactant that is cyanoethylated are vinyl compounds which are different from acrylonitrile, more particularly other aliphatic compounds containing a $CH_2=C<$ grouping, e.g., the various substituted acrylonitriles (e.g., methacrylonitrile, ethacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, vinyl esters, e.g., vinyl acetate, vinyl propionate, vinyl butyrate, vinyl isobutyrate, vinyl valerate, etc., esters of an acrylic acid (including acrylic acid itself and the various alpha-substituted acrylic acids, e.g., methacrylic acid, ethacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, etc., acids including the alkyl acrylates containing not more than four carbon atoms in the alkyl grouping, examples of which are given above, as well as other vinyl aliphatic compounds and other compounds containing a $CH_2=C<$ grouping, more particularly a single $CH_2=C<$ grouping.

Still other examples of unsaturated materials that can be copolymerized with acrylonitrile in forming the polymeric reactant are those which are generically and specifically set forth in, for instance, column 3, lines 5–47, of Price et al. U.S. Patent No. 2,722,525, dated November 1, 1955.

The use of vinyl aromatic compounds, more particularly vinyl aromatic hydrocarbons (e.g., styrene, the methyl and other alkyl styrenes, the various dialkyl styrenes, etc.), is not precluded. However, we prefer to use, in making the cyanoethylated copolymers of acrylonitrile employed in practicing the present invention, comonomers which are free from aromatic unsaturation and which, in the cyanoethylated copolymer molecule, would take up hydrogen during the hydrogenation process. This preference is not because the use of cyanoethylated polyacrylonitriles made from acrylonitrile and such comonomers is inoperative; but instead, it is because no particular advantage accrues from their use since it would involve increased consumption of hydrogen (with attendant increased cost), and more economical means are available for obtaining the same or a similar result when it is desired to introduce a saturated aliphatic ring into the copolymer molecule.

The average molecular weight of the polymeric acrylonitrile reactant that is cyanoethylated and then used in practicing the present invention can be varied widely, as desired or as conditions may require, but ordinarily it is within the range of from about 400 to about 3,000,000 or more as calculated from viscosity measurements using the Staudinger equation (reference: Houtz U.S. Patent No. 2,404,713, dated July 23, 1946); or by determining the average molecular weight by other known methods and coverting the value thereby obtained to a "Staudinger" average molecular weight (method described briefly above and more fully in the aforementioned patent). The polyacrylonitriles which are cyanoethylated, and the cyanoethylated polyacrylonitrile when used in practicing the present invention, are advantageously those having a "Staudinger" average molecular weight of not exceeding about 100,000, and preferably within the range of from about 400 to about 40,000 or 50,000, say, 500 to about to about 10,000.

The proportions of monomeric acrylonitrile to polymeric acrylonitrile likewise can be widely varied depending, for example, upon the time and temperature of reaction, the kind and amount of strong base used as a catalyst for the reaction, the degree of cyanoethylation desired, and other influencing factors. In general, however, the monomeric acrylonitrile is employed in a ratio of at least 1 mole thereof for each 100 alpha-carbon atoms in the backbone of the polyacrylonitrile. One can also use a ratio of 100 moles of monomeric acrylonitrile for each 100 alpha-carbon atoms in the polyacrylonitrile backbone when a higher degree of cyanoethylation is desired. Ordinarily, the monomeric acrylonitrile is employed in excess (e.g., from 50% to 1500% or more in excess) of that theoretically required to effect the desired degree of cyanoethylation under the particular reaction conditions.

In making the cyanoethylated polyacrylonitrile by this particular method, the reaction between the monomeric acrylonitrile and polymeric acrylonitrile is effected in an inert mutual solvent for said reactants; that is, a mutual solvent which is inert during the course of the reaction. Illustrative examples of such solvents are:

Dimethylformamide
N,N-dimethylcyanoacetamide
Dimethyl sulfoxide
Dimethyl sulfone
Ethylene thiocyanate
Trimethylene thiocyanate
Ethylene carbonate, and
Propylene carbonate The time of the reaction varies widely, depending upon the particular reaction conditions, and may range, for example, from a few minutes to two weeks or more.

If desired, the reaction mass can be neutralized at the end of the reaction period, e.g., by the addition of an acidic (or potentially acidic) substance such as acetic acid, trichloroacetic acid, ammonium chloride, or the like. After removing unreacted acrylonitrile, if present, the cyanoethylated polyacrylonitrile is then isolated either as a single product or in fractions having different physical characteristics, e.g., different softening points and solubilities.

In order that those skilled in the art better may understand how the present invention may be carried into effect, the following examples are given by way of illustration and not by way of limitation. All parts and percentages are by weight.

*Example 1*

(A) PREPARATION OF CYANOETHYLATED POLYACRYLONITRILE

A reaction vessel of suitable size is equipped with a stirrer, condenser, two dropping funnels, a thermometer and a nitrogen-inlet tube. The vessel is immersed in a water bath, which is maintained at about 50° C. throughout the entire reaction period. To this vessel are added monomeric acrylonitrile and a 1.0 N solution of sodium methoxide in methanol in small increments over the entire course of the reaction. The molar ratio of acrylonitrile to sodium methoxide added during the first 75 minutes of the polymerization reaction is approximately 1000/5. (At this point 1400 ml. of acrylonitrile and 60 ml. of 1.0 N sodium methoxide solution in methanol have been added.) Acrylonitrile is added for about 9 more minutes to a total volume of 2400 ml. Catalyst (sodium methoxide solution) is added up until 110 minutes from the start of the reaction, at which point the molar ratio of acrylonitrile/sodium methoxide is 1000/4.7.

At the end of the reaction period the reaction vessel is filled mostly with a hard mass with a smaller amount (about 25% of the total) of liquid floating on top. The clear, liquid layer is poured off; weight 1220 g. An excess of benzene (1300 g.) is added to this solution in order to precipitate the dissolved alpha-carbon cyanoethylated polyacrylonitrile that has been produced. The precipitated polymer (A) is collected by filtration, and washed with hexane, water, ethanol and ether in that order. The solid alpha-carbon cyanoethylated polyacrylontrile (B) remaining in the vessel is removed therefrom, and washed with hexane, water, ethanol and ether in that order.

Upon infrared examination it is found that cyanoethylated polyacrylonitrile fractions A and B, supra, have identical infrared spectra. They are ballmilled together for 45 minutes and then dried to form a homogeneous mixture or blend C. This mixture is found to be about 50% soluble in acrylonitrile monomer, completely soluble in acetone, soluble in dimethylformamide, and completely soluble in acetonitrile. The microisopiestic molecular weight is 1500±300; softening point, 172°–173° C. (Fisher-Johns melting point block); sodium content, 0.21%. The specific viscosity equals 0.44 (8 grams/100 ml. in acetonitrile at 30° C.). The infrared spectrum on this material indicates the $CH_2/CH_2CN$ ratio to be between 2/1 and 3/1; and also indicates the presence of about 5% ionized carboxyl ($-COO^-$) and about 2% carbamyl ($-CONH_2$) groupings. Some $-C=N-$ is observed. By other qualitative means it is further established that blend C contains no $-C=C-$ (carbon-to-carbon double bond) unsaturation. It is hydrogenated as described below.

(B) HYDROGENATION OF ALPHA-CARBON CYANOETHYLATED POLYACRYLONITRILE

Twenty (20) g. of alpha-carbon cyanoethylated polyacrylonitrile (blend C) in 190 ml. of dimethylformamide and 7 g. of Raney nickel catalyst are charged to a 300 ml. rocking autoclave; and therein subjected, with rocking, to 2000 p.s.i. of hydrogen pressure for a total of 21 hours at about 125° C. After 5 hours the pressure drop is 32% of the theoretical; and at the end of 21 hours it is 46% of the theoretical. The autoclave is cooled, the product removed, and the catalyst separated therefrom with a centrifuge. The solvent is removed at 100° C. under vacuum and the resulting, reddish-bbrown, hydrogenated solid is placed in a vacuum desiccator over sulfuric acid. The weight of the product is 22 g. It is completely soluble in glacial acetic acid and partly soluble in aqueous hydrochloric acid. The solubility in glacial acetic acid indicates the absence of any cross-linking having taken place in the polymer during the reduction.

Analysis of the product by infrared examination, titration with perchloric acid in glacial acetic acid, a Van Slyke analysis for primary amino nitrogen, and a buffered nitrogen determination for ammonium ion indicates the following groups to be present in the relative percentage (approximate) proportions set forth:

9% sec.-amine calculated as being in the form of a carboxylic ($-COO^-$) salt thereof
42% carbamyl ($-CONH_2$)
26% nitrile ($-CN$)
2% $-COO^-$, $NH_4^+$ The hydrogenated product of this example is useful as, for instance, an adjuvant to peroxy catalysts in resin formulations; as a catalyst for epoxy resins; and in making acid-addition salts that are useful as antistatic agents.

*Example 2*

(A) PREPARATION OF CYANOETHYLATED POLYACRYLONITRILE

A reaction vessel of adequate size is equipped with a stirrer, condenser, two dropping funnels, thermometer and a nitrogen-inlet tube, and means for heating the vessel at a controlled temperature, more particularly at 40° C. Over a period of 33 minutes there are charged to the vessel 2400 ml. (total amount) of acrylonitrile and 57 ml. of a 0.96 N solution of sodium methoxide in methanol (acrylonitrile/sodium methoxide molar ratio of 1000/1.5). At the end of 55 minutes the total volume of catalyst (sodium methoxide) added is 100 ml. (no additional acrylonitrile added) and the resulting molar ratio of acrylonitrile/sodium methoxide is, therefore, 1000/2.67.

The contents of the flask is filtered at this point and the yellow precipitate of cyanoethylated polyacrylonitrile that is present therein is collected, slurried in water, filtered, and dried. The dried product (designated as "I") is completely soluble in acetonitrile and in acetone, but insoluble in acrylonitrile. Its softening point is 171°–174° C. (Fisher-Johns melting point apparatus). The specific viscosity equals 0.435 (9.6 grams/100 ml.) in acetonitrile at 25° C.). The infrared spectrum indicates about 3% ionized carboxyl ($-COO^-$) and about 3% carbamyl ($-CONH_2$) groupings to be present, and a $CH_2/CH_2CN$ ratio of 3/1. The microisopiestic molecular weight is 2900±300.

The filtrate is treated with an excess of benzene and the yellow precipitate collected by filtration, washed with water, and dried. This product (designated as "II") is completely soluble in cyclohexanone, nitromethane, concentrated aqueous hydrochloric acid, acetonitrile, acetone, and acrylonitrile, but is insoluble in dioxane and isoamyl acetate. It softens at 151°–154° C. (Fisher-Johns melting point block). The specific viscosity equals 0.24 (8 grams/100 ml. in acetonitrile at 25° C.). The microisopiestic molecular weight, like that of product "I," is 2900±300. The infrared spectrum indicates, also like that of product "I," a $CH_2/CH_2CN$ ratio of 3/1 as well as about 3% ionized carboxyl (—$COO^-$) and about 3% carbamyl groupings.

(B) HYDROGENATION OF CYANOETHYLATED POLYACRYLONITRILE

Product II, of A, supra, is hydrogenated and isolated in essentially the same manner as described under B of Example 1. The hydrogenated product is useful in, for instance, the same applications therein set forth with respect to the hydrogenated product of that example; also, for coating aggregates prior to admixture with bituminous compositions, and in cement mixtures.

*Example 3*

To 1100 ml. of dimethylformamide is added 150 ml. of freeze-dried acrylonitrile monomer. The resulting solution is chilled in an ice bath, and 50 g. of pulverized homopolymeric acrylonitrile, having an average molecular weight of about 78,500 (Staudinger method), is added slowly thereto with vigorous stirring. After warming on a steam bath, a small quantity of insoluble material is filtered off through cheese cloth. To the clear filtrate is added 50 ml. of a 5% solution of potassium tert.-butoxide in tert.-butanol. An exotherm to 33° C. is observed and the mixture is immediately cooled to 20° C. in an ice bath. After standing at room temperature (20°–30° C.) for ten days, the fluid, reddish-black solution is poured, with stirring, into a large excess of ethanol. The yellow precipitate (cyanoethylated polyacrylonitrile) that forms is collected by centrifuging, washed with ethanol and air-dried. The yield of dried product is 59 g.

The dried cyanoethylated product is pulverized in a mortar and extracted with acetone in a Soxhlet extractor for 16 hours, air-dried, re-ground to a fine powder in a mortar, and then extracted with acetone for another 8 hours. The yellow-orange solid remaining in the Soxhlet thimble weighs 27 g. A study of the infrared curve obtained upon examining this material indicates that there is one cyanoethyl group on every third or fourth mer. The Staudinger molecular weight of this fraction (III) is approximately 39,000. It is insoluble in acetone and acrylonitrile monomer, but about 80% of it dissolves in acetonitrile.

The combined acetone extracts are evaporated to dryness and dried in vacuo. The residue is a yellow solid weighing 17.5 g. The Staudinger molecular weight of this fraction (IV) is about 26,000. Infrared examination indicates that there is one cyanoethyl group present for every three or four methylene groups (that is, one cyanoethyl group on every second or third mer or base unit). This fraction of cyanoethylated polyacrylonitrile is completely soluble in acetonitrile, acetone, and in acrylonitrile monomer.

Fraction IV is hydrogenated as described under B of Example 1. The resulting hydrogenation product is useful in the same applications as therein set forth with respect to the hydrogenation product of that example; and in other applications such as were mentioned under Example 2 with reference to the hydrogenation product of the second example.

*Example 4*

To a solution of 50 g. of homopolymeric acrylonitrile of molecular weight 1250 (microisopiestic molecular weight), prepared by the polymerization of acrylonitrile in dimethylformamide using alpha, alpha'-azodiisobutyronitrile as a polymerization catalyst, in 1100 ml. of dimethylformamide, is added 200 ml. of acrylonitrile (dried over anhydrous calcium sulfate and redistilled). This solution is cooled in an ice bath to 10° C. and 25 ml. of a 1.03 N solution of potassium tert.-butoxide in tert.-butanol is slowly added with vigorous shaking and cooling. The temperature of the mixture rises to 20° C., whereupon it is promptly cooled to 10° C. and then allowed to warm to room temperature (20°–30° C.). Three days later the reddish-black solution is poured into a large excess of ethanol, the polymer is filtered off, washed with ethanol followed by diethyl ether, and then dried. The yield of dried cyanoethylated polyacrylonitrile (V) amounts to 70 g. It is completely soluble in acetonitrile, moderately soluble in acetone and slightly soluble in acrylonitrile monomer. An infrared curver on the mixture indicates that about every third or fourth mer or base unit in the backbone chain of the polyacrylonitrile is cyanoethylated on the alpha-carbon atom. This estimate is based upon the presence of a strong band at $1420^{-1}$ in the cyanoethylated polymer associated with the presence of a —$CH_2CN$ grouping.

The above-described cyanoethylated polyacrylonitrile (V) is hydrogenated as described under B of Example 1. The hydrogenated product is useful in, for instance, the same applications hereinbefore set forth with respect to the hydrogenated products of the prior examples; also, as thickening agents and as modifiers, more particularly as plasticizers, of high-molecular-weight synthetic resins.

*Example 5*

To 10 g. of homopolymeric acrylonitrile (Staudinger molecular weight of about 78,000) dissolved in 90 g. of dimethylformamide, are slowly added 10 g. of freeze-dried monomeric acrylonitrile and 0.5 ml. of a 1.7 N sodium methoxide solution in methanol, at room temperature, over a period of 10 minutes. After 2½ hours at room temperature, the mixture is poured into an excess of ethanol, and the yellow solid (cyanoethylated polyacrylonitrile) that precipitates, is filtered off, rinsed with ethanol and dried. A portion of this dried, cyanoethylated polyacrylonitrile is extracted with acetone in a Soxhlet extractor for 8 hours. The reddish-orange acetone solution, upon evaporation to dryness, yields only a trace of a dark syrup. The extracted cyanoethylated polymer, now tan in color, is found to be insoluble in acetonitrile and in acrylonitrile monomer. An infrared curve on this product (VI), however, indicates that the polyacrylonitrile has been cyanoethylated to the extent of one cyanoethyl group on about every six or eight mers or units in the backbone chain.

The cyanoethylated polyacrylonitrile (VI) is hydrogenated in essentially the same manner as described under B of Example 1 with the exception that the reaction mass is maintained at a temperature of from about 150°–175° C. for a period of about 36 hours under hydrogen (initial H pressure of about 2200 p.s.i. instead of 2000 p.s.i. as in Example 1). The hydrogenation product is useful in, for instance, the same applications set forth in the prior examples with reference to the hydrogenation products of those examples. The aldehyde-reaction (more particularly formaldehyde-reaction) products of the hydrogenation product of the instant and the preceding examples are useful in, for example, resin (both natural and synthetic) formulations to plasticize or otherwise modify the resin.

*Example 6*

To 100 g. of dimethylformamide are added 5 g. of a copolymer of about 96% acrylonitrile and about 4% acrylic acid, and 20 ml. of dry acrylonitrile monomer. The Staudinger molecular weight of the copolymer is about 60,000. To the resulting solution at 20° C. is added 8.0 ml. of a 1.03 N solution of potassium tert.-butoxide in tert.-butanol, slowly and with cooling and stirring. After standing at room temperature for about 16 hours, the solution is poured into an excess of ethanol and the yellow precipitate (cyanoethylated copolymer of acrylonitrile and acrylic acid) is filtered off, washed with ethanol and dried. An infrared curve on this product (VII) indicates the copolymer to be cyanoethylated on about every fourth or fifth monomer unit on the backbone chain.

The cyanoethylated copolymer (VII) is hydrogenated in essentially the same manner as described under B of Example 1 with the exception that the reaction mass is maintained at a temperature of from about 145°–165° C. for a period of about 32 hours under hydrogen (initial H pressure of about 2100 p.s.i.). The hydrogenation product is useful in, for instance, the same applications set forth in the prior examples with reference to the hydrogenation products of those examples.

*Example 7*

To 120 g. of dry dimethylformamide are added 5 g. of a copolymer of about 85% acrylonitrile and about 15% butyl acrylate (Staudinger molecular weight about 52,000), and 20 ml. of dry, redistilled acrylonitrile. To this solution is added dropwise 1.5 ml. of 1.03 N potassium tert.-butoxide in tert.-butanol, with stirring and cooling, maintaining the temperature at 10° C. The temperature is then allowed to rise to 20° C. and held there for 5 hours, whereupon the cyanoethylated copolymer (VIII) is precipitated with ethanol, collected by filtration and dried. Infrared analysis indicates about every seventh to ninth monomer unit in the backbone chain is cyanoethylated on the alpha-carbon atom.

The cyanoethylated copolymer (VIII) is hydrogenated in essentially the same manner as described under B of Example 1 with the exception that the reaction mass is maintained at a temperature of from about 140°–155° C. for a period of about 30 hours under hydrogen (initial hydrogen pressure of about 2000 p.s.i as in B of Example 1). The hydrogenation product (especially in the form of salts thereof) is useful as a component of textile-finishing compositions; and, also, in the other applications set forth in the prior examples with reference to the hydrogenation products of those examples.

*Example 8*

Essentially the same procedure is followed as described under Example 7 in making a cyanoethylated copolymer with the exception that, instead of the copolymer of that example, there is used a copolymer of about 80% acrylonitrile and 20% methyl acrylate (Staudinger molecular weight about 66,000). Infrared analysis indicates that the isolated cyanoethylated copolymer (IX) is cyanoethylated on the alpha-carbon atom of about every ninth or tenth unit in the backbone chain.

The cyanoethylated copolymer (IX) is hydrogenated in essentially the same manner as described under B of Example 1 with the exception that the reaction mass is maintained at a temperature of from about 150°–170° C. for a period of about 34 hours under hydrogen (initial H pressure of about 2150 p.s.i.). The hydrogenation product is useful in, for instance, the same applications set forth in the prior examples with reference to the hydrogenation products of those examples.

*Example 9*

To 125 g. of dry dimethylformamide are added 5 g. of a copolymer of about 50% each of acrylonitrile and acrylamide (Staudinger molecular weight of about 90,000), and 20 g. of dry acrylonitrile. To the resulting solution is added 2.0 ml. of a 1 N solution of potassium tert.-butoxide in tert.-butanol, slowly, and at 15° C. After 5 hours at 20° C., with stirring, the cyanoethylated copolymer (X) is isolated by precipitation in a large excess of ethanol, washed with ethanol and dried.

The cyanoethylated copolymer (X) is hydrogenated in essentially the same manner as described under B of Example 1 with the exception that the reaction mass is maintained at a temperature of from about 160°–185° C. for a period of 43 hours under hydrogen (initial hydrogen pressure of about 4000 p.s.i.). The hydrogenation product is useful in, for instance, the same applications set forth in the prior examples with reference to the hydrogenation products of those examples.

*Example 10*

(A) PREPARATION OF CYANOETHYLATED POLYACRYLONITRILE

Into a reaction vessel equipped and set up as in Example 1 are charged a total of 400 ml. of monomeric acrylonitrile and 35 ml. of a 1.678 N solution of sodium methoxide in methanol. Initially and after 15 minutes there are charged to the vessel, while heating and stirring, 100 ml. acrylonitrile and 15 ml. of the sodium methoxide solution; after another 15 minutes, a third portion of 100 ml. acrylonitrile; and after 45 minutes more, the remaining amounts of acrylonitrile (100 ml.) and sodium methoxide solution (5 ml.). Heating and stirring are continued for an additional 30 minutes after charging the last of the acrylonitrile and sodium methoxide solution to the reaction vessel. The temperature of the reaction mass is maintained at 40°–43° C. during the entire 1¾-hour period of reaction.

At the end of this period the reaction mass containing alpha-carbon cyanoethylated polyacrylonitrile is poured out of the reaction vessel into another container, and to the latter also is added, with stirring, 50 ml. of dimethylformamide. The resulting solution is poured, with rapid stirring, into a large volume of benzene to precipitate the cyanoethylated polyacrylonitrile. The precipitated polymer is filtered off, dissolved in acetone, and reprecipitated in benzene. The reprecipitated alpha-carbon cyanoethylated polyacrylonitrile is filtered off, and washed with benzene, hexane, ethanol and ether in that order, followed by drying. The melting point of the dried product is 222°–226° C.; molecular weight, approximately 3000.

(B) HYDROGENATION OF CYANOETHYLATED POLYACRYLONITRILE

Using the same apparatus as described in Example 1, 11 g. of the cyanoethylated polyacrylonitrile of A dissolved in 125 ml. of dimethylformamide, and 7 g. of Raney nickel are subjected to 1900 p.s.i. of hydrogen pressure and heated to 126° C. for 5⅓ hours. The pressure drop is about 41% of the theoretical. The autoclave is cooled, vented, and the reaction mass removed as a reddish-brown solution. The catalyst is separated with a centrifuge and the solvent removed by heating to 100° C. under vacuum. Nine and one-half (9½) g. of a red, semi-crystalline, solid hydrogenation product is obtained. The product is soluble in aqueous hydrochloric acid. The infrared spectrum indicates that about one-half of the nitrile groups initially present in the cyanoethylated polyacrylonitrile have been reduced. A Van Slyke analysis for amino nitrogen is found to be essentially negative. A buffered nitrogen determination indicates the virtual absence of ammonium ion. A titration of the product with perchloric acid in glacial acetic acid indicates that about 22 out of every 100 nitrile groups have been converted to titratable secondary amino groups. The conclusion that the groups are secondary follows from the Van Slyke amino nitrogen determination showing the virtual absence of primary amino groups. The product is completely soluble in glacial acetic acid, indicating the absence of cross-linking in the polymer, during the reduction.

On the basis of the above information it is concluded that the reduced polymer (hydrogenation product) contains cyclic structures that may be represented by the following:

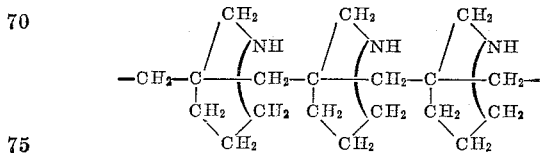

Similar ring structures are believed also to be present in the hydrogenation products of the prior examples.

The hydrogenation product of this example is useful in, for instance, the same applications set forth in the prior examples with reference to the hydrogenation products of those examples.

It is to be understood that our invention is not limited to the specific ingredients named in the above illustrative examples nor to the particular proportions and methods named therein. Other alpha-carbon cyanoethylated polymers of acryonitrile, used as a starting reactant in producing the hydrogenation products of this invention, can obviously be employed. Also, variations can be made in the method and extent of hydrogenation, including time, temperature and pressure used, kind and amount of hydrogenation catalyst employed, kind and amount of solvent or dispersion medium (if any) used, and in the other conditions of hydrogenation, as has been indicated in the portion of this specification prior to the examples.

Other uses of the hydrogenation products of this invention include their uses in blends with polyacrylonitriles (both homopolymers and copolymers) to impart better flow characteristics thereto during molding or otherwise forming shaped articles therefrom; and in plasticizing or otherwise modifying, to improve the useful properties thereof, a wide variety of other addition and condensation polymers natural resins and gums, etc., including various polyvinyl resins, urea-formaldehyde resins, phenol-formaldehyde resins, melamine-formaldehyde resins, epon resins, alkyd resins, polyester resins, rosin, shellac and others.

The present application is a continuation of application Serial No. 618,444, filed October 26, 1956, now abandoned.

We claim:

1. A method of forming a polyamine which comprises reacting an alpha-carbon cyanoethylated homopolymer of acrylonitrile with hydrogen under a pressure of at least 500 p.s.i. and at a temperature between about 110° C. to about 190° C. in the presence of a hydrogenation catalyst and an inert solvent for said homopolymer.

2. A method of forming a polyamine which comprises reacting a cyanoethylated homopolymer of acrylonitrile having cyanoethyl groups bonded to at least one-eighth of the alpha-carbon atoms of the homopolymer with hydrogen under a pressure of at least 500 p.s.i. and a temperature between about 110° C. to about 190° C. in the presence of a hydrogenation catalyst and an inert solvent for said homopolymer.

3. A method of forming a polyamine which comprises reacting a cyanoethylated homopolymer of acrylonitrile having cyanoethyl groups bonded to at least one-fourth of the alpha-carbon atoms of the homopolymer with hydrogen under a pressure of at least 500 p.s.i. and at a temperature between about 110° C. to about 190° C. in the presence of a hydrogenation catalyst and an inert solvent for said homopolymer.

4. A method of forming a polyamine which comprises reacting a cyanoethylated homopolymer of acrylonitrile having at least one-fourth of its monomer units represented by the structural formula

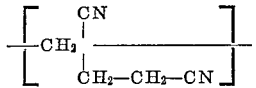

with hydrogen under a pressure of at least 500 p.s.i. and at a temperature between about 110° C. to about 190° C. in the presence of a hydrogenation catalyst and an inert solvent for said homopolymer.

5. A hydrogenated alpha-carbon cyanoethylated homopolymer of acrylonitrile having at least every fourth alpha-carbon atom cyanoethylated where from about 10% to about 30% of the cyano groups have been reduced, said homopolymer having had been hydrogenated with hydrogen under a pressure of at least 500 p.s.i. and at a temperature between about 110° C. to about 190° C. in the presence of a hydrogenation catalyst and an inert solvent for said homopolymer.

6. A hydrogenated alpha-carbon cyanoethylated homopolymer of acrylonitrile having at least every fourth alpha-carbon atom cyanoethylated where from 5% to 50% of the cyano groups have been reduced, said polymer having been hydrogenated with hydrogen under a pressure of at least 500 p.s.i. and at a temperature between about 110° C. to about 190° C. in the presence of a hydrogenation catalyst and an inert solvent for said homopolymer.

References Cited in the file of this patent

UNITED STATES PATENTS

| | | |
|---|---|---|
| 2,456,428 | Parker | Dec. 14, 1948 |
| 2,585,583 | Pinkney | Feb. 12, 1952 |
| 2,608,554 | Bullitt | Aug. 26, 1952 |
| 2,917,474 | Fisher et al. | Dec. 15, 1959 |
| 2,977,337 | Schuller | Mar. 28, 1961 |

OTHER REFERENCES

The Chemistry of Acrylonitrile, American Cyanamid Company, Beacon Press Inc., New York, 1951, pages 41-2, 51.

UNITED STATES PATENT OFFICE
CERTIFICATE OF CORRECTION

Patent No. 3,122,526            February 25, 1964

Walter H. Schuller et al.

It is hereby certified that error appears in the above numbered patent requiring correction and that the said Letters Patent should read as corrected below.

Column 14, lines 11 to 15, the formula should appear as shown below instead of as in the patent:

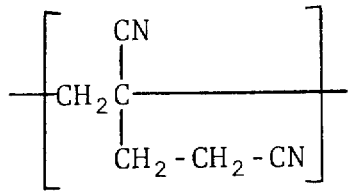

Signed and sealed this 13th day of July 1965.

EAL)
test:

?NEST W. SWIDER                                    EDWARD J. BRENNER
testing Officer                                       Commissioner of Patents